(12) United States Patent
Strasser et al.

(10) Patent No.: US 12,276,255 B2
(45) Date of Patent: Apr. 15, 2025

(54) INSULATED PITCH TUBE

(71) Applicants: ZF FRIEDRICHSHAFEN AG, Friedrichshafen (DE); ZF WIND POWERANTWERPEN N.V., Lommel (BE); VESTAS WIND SYSTEMS A/S, Aarhus (DK)

(72) Inventors: Dirk Strasser, Breckerfeld (DE); Dietmar Weist, Dortmund (DE); Deyan Stoyanov, Bochum (DE); Ralf Sperlich, Witten (DE)

(73) Assignees: ZF FRIEDRICHSHAFEN AG, Friedrichshafen (DE); ZF WIND POWER ANTWERPEN N.V., Lommel (BE); VESTAS WIND SYSTEMS A/S, Aarhus N (DK)

( * ) Notice: Subject to any disclaimer, the term of this patent is extended or adjusted under 35 U.S.C. 154(b) by 91 days.

(21) Appl. No.: 17/642,713

(22) PCT Filed: Aug. 17, 2020

(86) PCT No.: PCT/EP2020/072957
§ 371 (c)(1),
(2) Date: Mar. 14, 2022

(87) PCT Pub. No.: WO2021/052693
PCT Pub. Date: Mar. 25, 2021

(65) Prior Publication Data
US 2022/0341398 A1    Oct. 27, 2022

(30) Foreign Application Priority Data
Sep. 20, 2019 (EP) .................................. 19198725

(51) Int. Cl.
*F01D 25/00* (2006.01)
*F03D 15/00* (2016.01)
(Continued)

(52) U.S. Cl.
CPC ............. *F03D 15/00* (2016.05); *F16H 15/52* (2013.01); *F16H 57/029* (2013.01); *F03D 80/85* (2016.05);
(Continued)

(58) Field of Classification Search
CPC ..................... F03D 15/00; F03D 80/70; F05B 2260/40311; F16H 57/082; F16C 2360/31
(Continued)

(56) References Cited

U.S. PATENT DOCUMENTS 6,019,292 A    2/2000  Walther
9,018,789 B2*  4/2015  Smook ..................... F03D 9/25
                                                       290/55
(Continued)

FOREIGN PATENT DOCUMENTS

CN    207161276 U    3/2018
DE    102014000044 B3    5/2015
(Continued)

*Primary Examiner* — Long T Tran
*Assistant Examiner* — James J Kim
(74) *Attorney, Agent, or Firm* — LEYDIG, VOIT & MAYER, LTD.

(57) ABSTRACT

An arrangement includes a transmission, a pitch tube, and a fixation device configured to affix the pitch tube in the transmission. The fixation device is electrically insulated from the pitch tube. The pitch tube can be axially movable relative to the fixation device. The pitch tube can be fixed in a shaft or a rotatably-mounted planet carrier of the transmission by the fixation device.

12 Claims, 1 Drawing Sheet

(51) Int. Cl.
  *F16H 15/52*   (2006.01)
  *F16H 57/029*  (2012.01)
  *F03D 80/80*   (2016.01)
  *F16H 57/02*   (2012.01)

(52) U.S. Cl.
  CPC ............... *F05B 2260/40* (2013.01); *F16H 2057/02078* (2013.01)

(58) Field of Classification Search
  USPC ....................................... 416/170 R
  See application file for complete search history.

(56) References Cited

U.S. PATENT DOCUMENTS

| | | | | |
|---|---|---|---|---|
| 10,359,029 | B2* | 7/2019 | Smet | F03D 80/85 |
| 2011/0309631 | A1* | 12/2011 | Rebsdorf | F03D 15/20 |
| | | | | 290/55 |
| 2013/0162066 | A1* | 6/2013 | Stamm | H02K 21/42 |
| | | | | 310/46 |
| 2013/0165288 | A1 | 6/2013 | Dinter et al. | |
| 2013/0172141 | A1* | 7/2013 | Dinter | F16H 1/46 |
| | | | | 475/149 |
| 2013/0328660 | A1* | 12/2013 | Sshott | H01C 1/00 |
| | | | | 338/204 |
| 2016/0091029 | A1 | 3/2016 | Jansen et al. | |
| 2016/0341183 | A1 | 11/2016 | Smet | |
| 2017/0023067 | A1 | 1/2017 | Hoves et al. | |
| 2017/0030335 | A1 | 2/2017 | Deicke et al. | |
| 2020/0292058 | A1* | 9/2020 | De Laet | F03D 80/85 |
| 2022/0333580 | A1* | 10/2022 | De Laet | F03D 15/00 |

FOREIGN PATENT DOCUMENTS

| | | |
|---|---|---|
| DE | 102014200674 A1 | 7/2015 |
| DE | 102017212537 A1 | 1/2019 |
| EP | 2080904 A1 | 7/2009 |
| EP | 2273112 A2 | 1/2011 |
| EP | 2508753 A1 | 10/2012 |
| EP | 2541058 A1 | 1/2013 |
| EP | 2617994 A1 | 7/2013 |
| EP | 2933483 A1 | 10/2015 |
| EP | 3001062 A1 | 3/2016 |
| WO | WO 2013085130 A1 | 6/2013 |
| WO | WO 2018121819 A1 | 7/2018 |

* cited by examiner

INSULATED PITCH TUBE

CROSS REFERENCE TO RELATED APPLICATIONS

This application is a U.S. National Phase application under 35 U.S.C. § 371 of International Application No. PCT/EP2020/072957, filed on Aug. 17, 2020, and claims benefit to European Patent Application No. EP 19198725.4, filed on Sep. 20, 2019. The International Application was published in German on Mar. 25, 2021 as WO 2021/052693 A1 under PCT Article 21(2).

FIELD

The disclosure relates to an arrangement having a transmission, a pitch tube, and a fixation means.

BACKGROUND

When it comes to wind turbines, there is a trend towards integrated drive trains. In integrated drive trains, the transmission and the generator form a structural unit. This entails problems with stray currents. The stray currents can occur in the form of high-frequency alternating currents or low-frequency direct or alternating currents. There is a risk of damage to gear teeth and rolling bearings due to voltage flashovers.

In order to avoid consequential damage due to stray currents, suitable measures for insulation must be taken. In the case of drive trains running at medium speed, however, the torques between the transmission and the generator that are to be transmitted are comparatively high. At the same time, there is a lack of available space between the transmission and the generator due to the integrated design of the drive train. This makes sufficient dimensioning of the torque-transmitting components difficult. This relates in particular to the electrical insulation of the torque-transmitting components.

In particular, electrical insulation of the so-called pitch tube is problematic, since the length pitch tube changes in the axial direction during temperature fluctuations. At the same time, the diameter of the pitch tube changes. Due to different coefficients of thermal expansion of the pitch tube and the materials under consideration as an electrical insulator, there is therefore the risk that the pitch tube may "seize" inside the insulator.

SUMMARY

In an embodiment, the present disclosure provides an arrangement. The arrangement includes a transmission, a pitch tube, and a fixation device configured to affix the pitch tube in the transmission. The fixation device is electrically insulated from the pitch tube. The pitch tube can be axially movable relative to the fixation device. The pitch tube can be fixed in a shaft or a rotatably-mounted planet carrier of the transmission by the fixation device.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
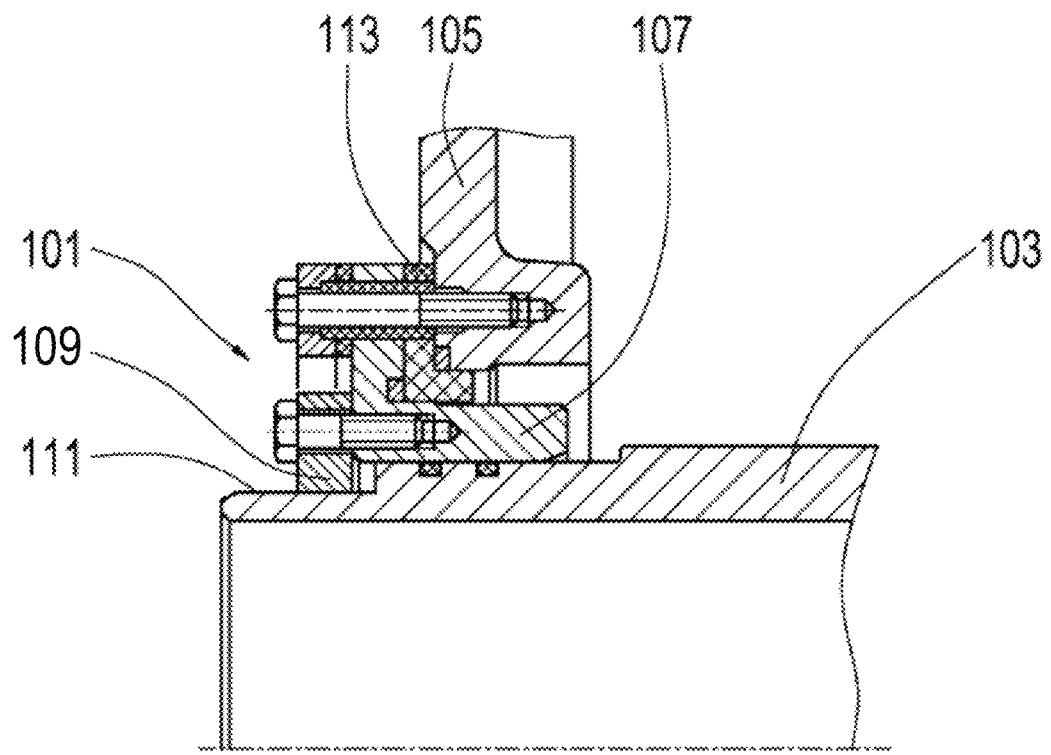
FIG. 1 shows a fixation means with an inlay.

The disclosure is based upon the aim of providing a solution that is better than the transmissions known from the prior art. In particular, damage that can occur in an integrated drive train due to stray currents is to be avoided.

The transmission can, in particular, be a transmission for a wind turbine. A pitch tube is a tube for passing—for example, electrical or hydraulic—supply lines through the transmission. It is characterized in that it passes through the transmission or the housing of the transmission, and its orifices are arranged outside the transmission or housing of the transmission. The pitch tube is preferably sealed against the housing of the transmission so as to be impermeable to lubricant.

The pitch tube is fixed in the transmission, i.e., in at least one component of the transmission, by means of the fixation means. The pitch tube usually has a rotationally-symmetrical design. Accordingly, the fixation means is preferably also rotationally symmetrical.

The disclosure is based upon the finding that the pitch tube is a significant transmitter of stray currents due to the fact that it passes completely through the transmission. According to the disclosure, the fixation means is therefore designed to be electrically insulated from the pitch tube. The fixation means thus electrically insulates the pitch tube and the component of the transmission, in which the pitch tube is fixed by means of the fixation means, from one another. This eliminates a major causer of creepage currents. The solutions according to the disclosure effectively prevent creepage currents emanating from a generator from being introduced into the transmission via the pitch tube. The insulation is particularly suitable for integrated drive trains, since it takes up only a small amount of installation space.

The pitch tube is preferably developed further so as to be movable axially relative to the fixation means, i.e., in the direction of an axis of rotation, e.g., an axis of rotation of the component in which the pitch tube is fixed by means of the fixation means. This makes it possible to compensate for changes in the length of the pitch tube as a result of temperature fluctuations.

In a preferred development, the component of the transmission in which the pitch tube is fixed by means of the fixation means is a shaft - in particular, a hollow shaft - or a rotatably-mounted planet carrier. According to the development, the fixation means electrically insulates the pitch tube from the shaft or planet carrier.

In a further preferred development, the fixation means has a continuous hole. The hole is centered, i.e., its center axis coincides with a center axis of the pitch tube. In particular, the pitch tube and the hole can be rotationally symmetrical. In this case, an axis of symmetry of the pitch tube and an axis of symmetry of the hole coincide. The pitch tube passes through the hole and is provided there with the fixation means.

In a preferred development, the fixation means is joined along its radially outer edge to the component of the transmission in which the pitch tube is fixed, or to the shaft or planet carrier.

In a preferred development, the fixation means has an electrical non-conductor and a base body. The latter can consist of an electrically-conductive material. The electrical non-conductor is arranged between the pitch tube and the main body, or, according to the development, between the base body and the component of the transmission in which the pitch tube is fixed by means of the fixation means, or between the base body and the shaft or planet carrier.

The base body is preferably further developed in such a way that at least a part of the base body is arranged radially between the pitch tube and the non-conductor. This part of the base body is preferably self-contained in the circumferential direction. In particular, the part of the base body can be formed as a hollow cylinder. It preferably completely fills an intermediate space running between the pitch tube and the non-conductor. Further preferred is a base body, the material of which has the same coefficient of thermal expansion as the material of the pitch tube. In particular, the base body and the pitch tube can consist of the same material.

The development is advantageous if the non-conductor and the pitch tube have different coefficients of thermal expansion. There would then be the risk that different dimensional changes due to temperature fluctuations could impair the axial mobility of the pitch tube in the fixation means. In contrast, the part of the fixation means according to the development shields the pitch tube from dimensional changes of the non-conductor. The axial mobility of the pitch tube is thus ensured.

The arrangement is preferably further developed with a generator which is operatively connected to the transmission so as to rotate. This means that an output shaft of the transmission is connected to an input shaft of the generator so as to be torque-proof. In particular, the transmission and the generator can form an integrated drive train.

In a further preferred development, a clutch is provided which connects the output shaft of the transmission to the input shaft of the generator so as to be torque-proof. The coupling acts in an electrically-insulating manner. Complete electrical insulation of the voltage-threatened components of the transmission and of the generator is thereby ensured.

The present disclosure provides for an electrically-conductive pitch tube—for example, a metallic pitch tube. Solutions according to the present disclosure can be alternatively implemented by having the pitch tube itself instead of the fixation means act in an electrically-insulating manner. This can be achieved by means of a pitch tube consisting of an insulator.

The fixation means 101 shown in FIG. 1 serves to fix a pitch tube 103 on the drive side in a planet carrier 105. In particular, the radial position of the pitch tube 103 is fixed by the fixation means 101. The fixation means 101 itself is rigidly fixed in the planet carrier 105, i.e., a fixation between the fixation means 101 and the planet carrier 105 does not allow any relative movements between the fixation means 101 and the planet carrier 105.

A metallic base body 107 of the fixation means 101 is L-shaped in cross-section. The base body 107 is screwed to the planet carrier 105. Corresponding screw connections are designed to be electrically insulating.

A lug 109 screwed to the base body 107 engages in a recess 111 of the pitch tube 103 in order to fix the pitch tube 103 so as to be torque-proof relative to the planet carrier 105.

An insulating layer (also referred to herein as an electrical non-conductor) 113 is introduced into a gap running between the base body 107 and the planet carrier 105. The insulating layer 113 consists of an electrical insulator, such as polyamide. The insulating layer 113 electrically insulates the base body 107 and thus the pitch tube 103 from the planet carrier 105. The cross-section of the insulating layer 113 is also L-shaped, like the cross-section of the base body 107.

The axial leg of the base body 107 that is L-shaped in cross-section extends in the axial direction between the insulating layer 113 and the pitch tube 103. In this way, dimensional changes of the insulating layer 113 due to temperature fluctuations are prevented from affecting the pitch tube 103. The axial displaceability of the pitch tube 103 relative to the planet carrier 105 is thus maintained even in the event of temperature fluctuations.

Figure 2:
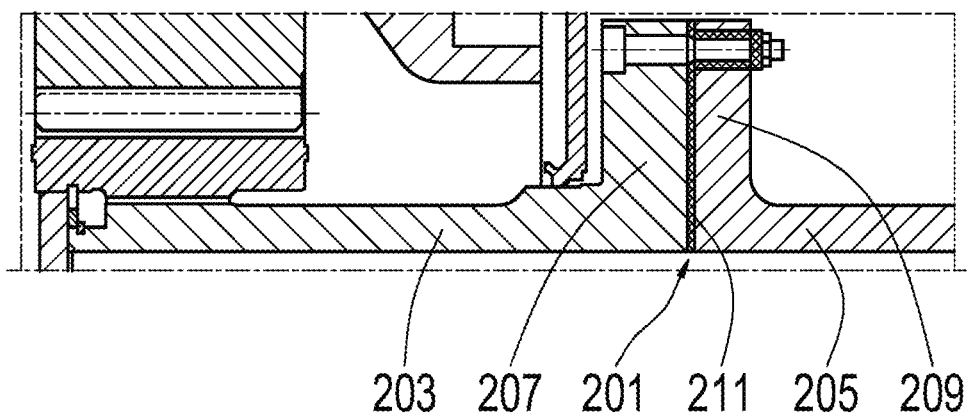
FIG. 2 shows a coupling.

The coupling 201 shown in FIG. 2 connects a sun shaft 203 on the output side to an input shaft 205 of a generator. The sun shaft 203 forms a first flange 207, and the input shaft 205 of the generator forms a second flange 209. The first flange 207 and the second flange 209 are screwed together. This produces a torque-proof connection between the first flange 207 and the second flange 209.

A disk 211 consisting of an electrical insulator is located between the first flange 207 and the second flange 209. The screw connections of the first flange 207 and of the second flange 209 are also encapsulated with electrical insulators. Thus, the sun shaft 203 and the input shaft 205 of the generator are electrically insulated from each other. In combination with the insulated pitch tube, complete insulation of the transmission from the generator is achieved.

Such a combination is advantageous in particular because the insulations can be arranged completely within the installation space of the transmission. The interfaces of the transmission to the outside are therefore not influenced.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

List of Reference Characters
101 Fixation means
103 Pitch tube
105 Planet carrier
107 Base body
111 Recess
113 Insulating layer 201 Coupling
203 Sun shaft
205 Input shaft
207 First flange
209 Second flange
211 Disk

The invention claimed is:

1. An arrangement, comprising:
a transmission part,
a pitch tube, and
a fixation device configured to affix the pitch tube to the transmission part, the fixation device including a base body and an electrical non-conductor,
wherein the fixation device is electrically insulated from the pitch tube by the electrical non-conductor, and
wherein the electrical non-conductor is arranged in its entirety between the transmission part and the base body of the fixation device.

2. The arrangement according to claim 1, wherein the pitch tube is axially movable relative to the fixation device.

3. The arrangement according to claim 1, wherein the transmission part includes a shaft or a rotatably mounted planet carrier, and wherein the pitch tube is fixed in the shaft or the rotatably-mounted planet carrier by the fixation device, and wherein the fixation device electrically insulates the pitch tube from the shaft or planet carrier.

4. The arrangement according to claim 1, wherein the fixation device has a central, continuous hole, and wherein the fixation device is joined to the pitch tube in the hole.

5. The arrangement according to claim 3, wherein the fixation device is joined along its radially outer edge to the shaft or planet carrier.

6. The arrangement according to claim 1, wherein at least part of the base body is arranged radially between the pitch tube and the electrical non-conductor.

7. The arrangement according to claim 1, further comprising a generator that is operatively connected to the transmission part so as to rotate.

8. The arrangement according to claim 7, wherein a coupling connects an output shaft of the transmission to an input shaft of the generator, wherein the coupling is designed to be electrically insulating.

9. The arrangement according to claim 1, wherein the base body extends between the pitch tube and the electrical non-conductor such that the electrical non-conductor does not contact the pitch tube.

10. The arrangement according to claim 1, further comprising a lug, wherein the pitch tube comprises a radial recess and the lug is configured to be received in the radial recess of the pitch rube.

11. The arrangement according to claim 1, comprising a first fastener and a second fastener,
wherein the first fastener is arranged to extend in an axial direction and configured to secure the base body, the electrical non-conductor, and the transmission part to one another, and
wherein the second fastener is arranged to extend in the axial direction and configured to directly secure the lug to the base body without extending entirely through the base body.

12. An arrangement, comprising:
a sun shaft with a first flange, the first flange extending radially relative to an axial extent of the sun shaft;
an input shaft of a generator, the input shaft forming a second flange extending radially relative to an axial extent of the input shaft;
a disk consisting of an electrical insulator arranged in its entirety between the first flange and the second flange such that the sun shaft and the input shaft are electrically insulated from one another; and
a fastener configured to secure the first flange and the second flange to one another through the disk,
wherein the fastener is encapsulated with a further electrical insulator.

* * * * *